Jan. 23, 1934.　　　H. S. DICKINSON　　　1,944,410
MOWER
Filed July 11, 1932　　　2 Sheets-Sheet 1

Inventor:
Harry S. Dickinson
By John P. Smith Atty.

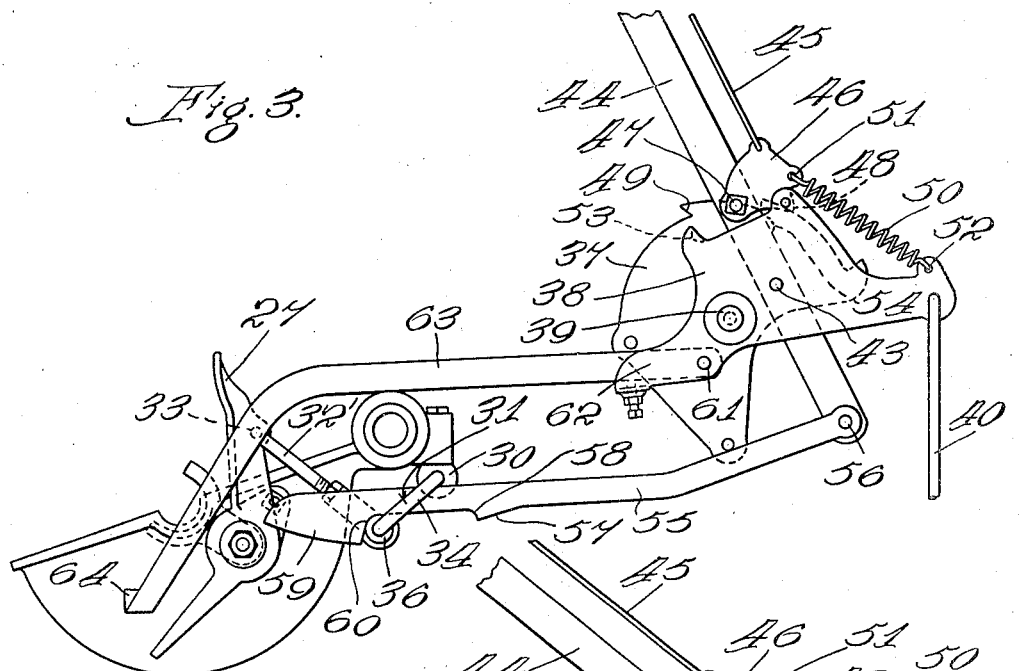
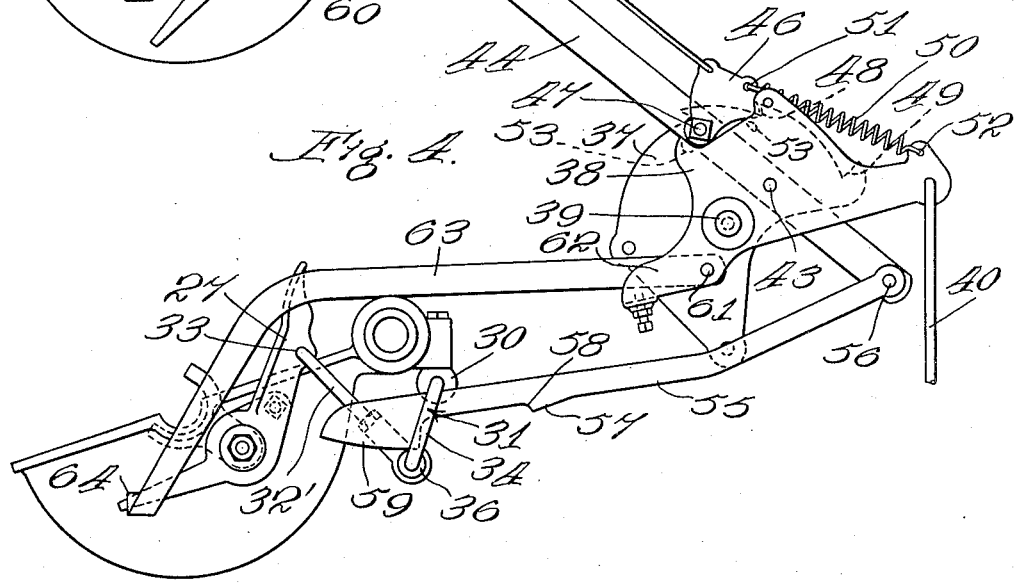
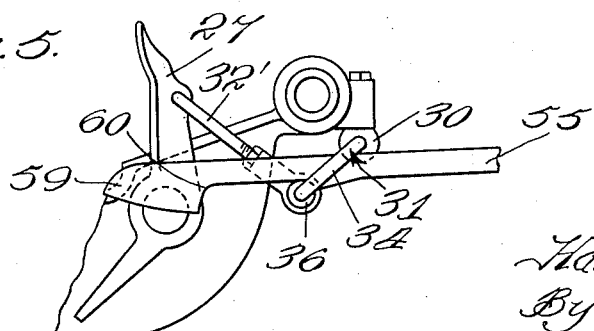

Patented Jan. 23, 1934

1,944,410

UNITED STATES PATENT OFFICE 1,944,410

MOWER

Harry S. Dickinson, South Bend, Ind., assignor to Oliver Farm Equipment Company, a corporation of Delaware Application July 11, 1932. Serial No. 621,791

10 Claims. (Cl. 56—276)

The present invention is directed generally to an improved construction of mower, but more particularly to a novel and improved clutch control mechanism and cutter bar lifting lever mechanism.

One of the objects of the present invention is to provide a novel and improved clutch controlling mechanism for a mower which controls the engagement and disengagement of the clutch when the hand operating lever is actuated to raise or lower the cutter bar.

A further object of the invention is to provide a novel and improved manually operable lever which is pivoted to the lifting arm of the mower and normally held forwardly in an unobstructed position with respect to the operator of the mower.

These and other objects are accomplished by providing a construction and arrangement of the various parts in a manner hereinafter described and particularly pointed out in the appended claims.

Referring to the drawings, Fig. 1 is a top plan view of a conventional form of mower having my invention embodied therein.

Fig. 3 is a fragmentary side elevational view showing the relative position of the manual lever and the clutch control mechanism.

Figures 1, 2:
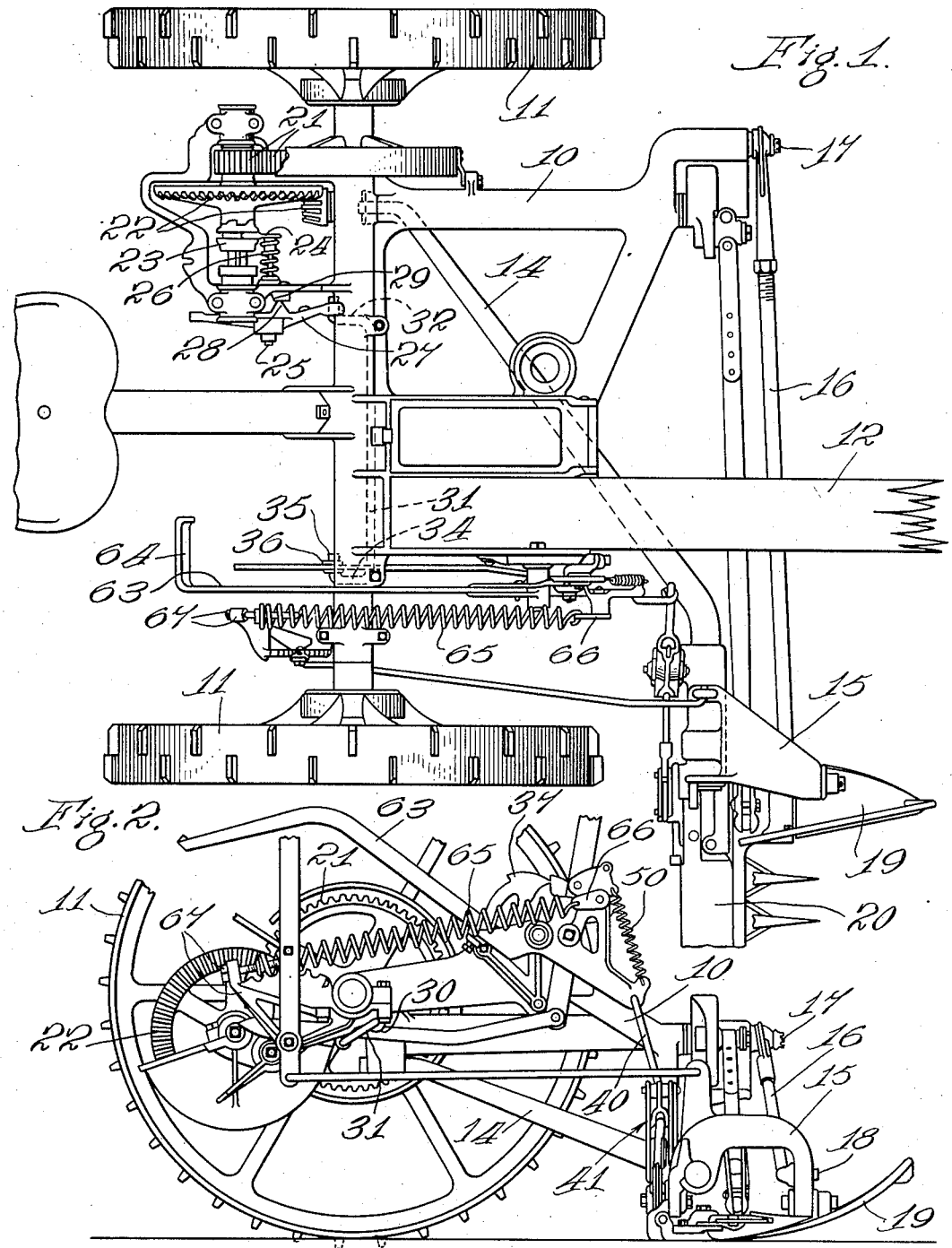
Fig. 2 is a fragmentary side elevational view of the mower shown in Fig. 1.

Fig. 4 is a similar fragmentary side elevational view showing the position of the manual lever with the cutter bar partially raised and the clutch operating mechanism actuated to its position to disengage the clutch, and Fig. 5 is a fragmentary side elevational view showing the position in which the clutch control mechanism is actuated to force the clutch into engagement when the mower bar is lowered to its operative position.

In illustrating one form of my invention I have shown the same in connection with a conventional form of mower which comprises a main frame generally indicated by the reference character 10, which in turn is supported on the usual traction wheels 11. Secured to the main frame 10 is the usual forwardly extending tongue 12. Pivoted to the main frame 10 is a supplemental frame 13 which includes a coupling bar 14, which has its foremost end journalled in a coupling yoke 15, and its rear end pivotally secured to the underside of the main frame 10. Pivotally connected to the forward end of the yoke member 15 is an adjustable and supplemental frame bar 16, which has one end thereof pivoted, as shown at 17, and the other end thereof pivoted, as shown at 18, to the yoke member 15. Pivotally connected to the yoke member 15, in a manner well understood in the art, is a shoe 19, which in turn, is provided with the usual cutter or knife bar 20.

The reciprocation of the knife or rather the power for actuating the knife is transmitted by the traction wheels in a manner well understood in the art, through the medium of spur pinion gears generally indicated by the reference character 21, and bevelled gear and pinion generally indicated by the reference character 22. Reciprocally mounted on the shaft which supports the bevelled gear 22 is a sliding clutch collar 23 which is adapted to engage in clutching engagement with the bevelled gear. Engaging the clutch collar 23 is a clutch fork 24 which is mounted on one end of a shaft 25. The clutch fork is normally pressed in a direction to force the clutch collar 23 into engagement with the clutching portion of the bevelled gear 22 by means of a compression spring 26. Secured to the other end of the clutch shaft 25 is a lever 27 which is provided on one side thereof with a camming lug 28 which in turn is adapted to engage a complementary camming surface 29 formed on the main frame 10 of the mower. The mechanism thus far described is essentially a form of a conventional mower and forms no part of the present invention except in combination with my improvement hereinafter described.

Journalled below the main frame 10 in suitable eye bolts 30, which are secured to the main frame, is a crank shaft 31, which has a crank arm 32 formed on one end thereof, to the outer end of which is pivotally connected, an adjustable link connection generally indicated by the reference character 32'. The rear end of this link is pivotally connected, as shown at 33, to the clutch lever 27. The other end of the crank shaft 31 is provided with a crank arm 34 which has a right angularly and inwardly extending portion 35 on which a roller 36 is journalled. Secured to the main frame 10 adjacent the tongue 12 is a quadrant or sector 37, which has pivoted to one side thereof, a lifting arm 38. The lifting arm 38 is pivoted, as shown at 39, to the sector 37, and has the forward or free end thereof connected by means of a link 40 to a common form of link mechanism generally indicated by the reference character 41, which in turn is connected, to the shoe 19 in a manner well understood in the art, for adjusting the cutter bar 20 both vertically and horizontally to various positions of adjustment and into elevated inoperative position. Pivoted to the lifting arm 38 at a point forwardly of the pivot 39, as shown at 43, is a manually operable lifting lever 44. The lever 44 is provided with a detent mechanism which includes a finger lever pivoted on the upper or free end of the lever 44 (not shown), and a connecting rod 45 which has its lower end connected to a pawl 46 pivoted to the lever, as shown at 47. The pawl 46 is provided with a tooth 48 on the free end thereof, which is adapted to engage any one of the three lugs or notches 49 of the sector or quadrant 37 for locking the lever and lifting arm 38 in various positions of adjustment to thereby hold the cutter bar in various positions of operating adjustment, or in inoperative position with respect to the main frame of the mower. The outer or free end of the pawl 46 is normally pressed into engagement against the sector 37 by means of an extension spring 50, which has one end thereof connected to the forward end of the pawl 46, as shown at 51, and the other end thereof connected, as shown at 52, to the forward end of the lifting arm 38. The operating lever 44 is limited in its free movement with respect to the lifting arm 38 by means of a lug 53 which is adapted to engage the rear edge of the lever 44 in its manipulation to raise the cutter bar. The lever is limited in its forward movement with respect to the arm 38 by an inwardly projecting lug 54, which is adapted to engage the forward edge of the lever 44 as clearly shown in Fig. 3 of the drawings.

From the above description it will be noted that the extension spring which is connected at one end to the pawl 46 and at the other end to the forwardly extending portion of the lifting arm 38 so as to perform the double function of depressing the free end of the pawl into engagement with the sector 37 and at the same time normally urge the lever 44 about its pivot 43 to a position forwardly against the lug 54 of the lifting arm 38 so as to maintain the lever in a forward position or unobstructed position out of the way of the operator of the mower.

Another essential feature of the invention is the provision of a novel means for controlling the engagement and disengagement of the clutch when the cutter bar reaches a predetermined position of its adjustment. This means is in the form of a lost motion connection and also serves to lock the clutch mechanism in disengaged position when the lifting lever and its associated parts assume a predetermined position. This mechanism includes a slightly curved link, generally indicated by the reference character 55, the forward end of which is pivotally connected, as shown at 56, to the lower end of the lever 44 below its pivot 43 on the lifting arm 38. The lower edge of the connection 55 is provided intermediate its end with a downwardly projecting lug 57 which is curved on the rearward side, as shown at 58, so as to engage the periphery of the roller 36 journalled on the lower end of the crank arm 35 of the shaft 31. Formed on the rear end of the link or connection 55 is a second downwardly projecting lug generally indicated by the reference character 59 which has its forward portion curved, as shown at 60, so as to engage the periphery of the roller 36. This lug 59 is slightly curved upwardly and rearwardly with respect to the link so as to form a smooth surface from the locking portion of the lug to the termination of the link, as clearly shown in Figures 3 and 4 of the drawings. Pivoted as shown at 61 to a rearwardly extending arm 62 formed on the lifting arm 38 is a foot operating lever 63 which is curved rearwardly and downwardly over the main frame of the mower and is provided with a foot treddle 64 so that the operator thereof may make use of his foot in assisting the manipulation of the hand lever 44 for lifting the cutter bar in a manner well understood in the art.

Of course, the mower is provided with the usual balancing spring generally indicated by the reference character 65 (see Fig. 2) which has its forward ends connected by means of a bracket 66 to the upper portion of the lifting arm 38 and rearward end adjustably connected by means of a bracket and bolt 67 to the main frame 10 of the mower.

The operation of my improved mower is as follows: let us assume that the mower is in its operative position or the position shown in Figs. 1 and 2, in which position the clutch is operatively engaged so as to drive the cutter knife of the bar with the operating levers in their respective positions as shown in these figures. If the operator is desirous of raising the cutter bar into its elevated or inoperative position, the operator places his foot on the foot lever 64 and simultaneously engages the free or upper end of the hand operating lever 44 and swings both of these levers downwardly and rearwardly. In so doing, the lost motion connection 55 together with the lever 44 will be moved from the position, shown in Fig. 2, to the position shown in Fig. 3, in which the curved surface 60 of the lug 59 of the link 55 will engage the roller 36 on the lower end of the crank 35 so that on a further movement of the lever 44 from the position shown in Fig. 3 to the position shown in Fig. 4, the crank shaft 31 will be revolved so as to swing the crank 35 forwardly and carry with it the crank 32 which in turn is connected by the link 32' to the clutch lever 27, to thereby disengage the sliding clutch member from the complementary clutch member 22 of the bevelled gear 20. In this connection it will be noted that the rearward end of the link 55 is guided between the roller 36 and the lower surface of the crank shaft 31 adjacent the right hand eye bolt 30 so as to prevent its displacement therefrom. At the same time the curved surface of the downwardly projecting lug 59 of the link 55 will ride over the roller 36 so as to form an effective lock for holding the clutch in disengagement position and so as to permit a further lost motion between the operating lever 44 after the clutch has been disengaged by the movement of the link 55. It will be further noted that the locking pawl 46 carried by the lever 44 may be locked in any of the notches or teeth 49 of the sector 37 for retaining or maintaining the cutter bar in a slightly elevated or in the intermediate elevated position or in the extreme position, shown in Fig. 4, in which position the clutch is locked against accidental engagement.

From the above specification it will be readily seen that I have provided a simple and improved construction of a semi-automatic clutch controlling mechanism in which the lost motion connection performs the double function of disengaging the clutch mechanism of the mower and of forcing into engagement the clutch mechanism of the mower, and at the same time performs the function of positively locking the mower out of disengagement against accidental engagement. On the reverse operation of the lifting lever 44 it will be noted that when the lever is sprung forwardly the connecting link 55 moves rearwardly so that the lug or curved portion 58 of the lug 57 of this link 55 engages the roller 36 to force the crank arm 35 rearwardly and thereby the clutch lever 27 rearwardly. This in turn forces the clutch mechanism into engagement simultaneously with the lowering of the cutter bar.

While in the above specification I have described one embodiment which my invention may assume in practice, it will of course, be understood that the same is capable of modification, and that modification may be made without departing from the spirit and scope of the invention as expressed in the following claims.

What I claim as my invention and desire to secure by Letters Patent is:

1. In a mowing machine, a main frame, a coupling frame pivotally connected therewith, a lifting arm pivoted to said main frame and connected with said coupling frame, a manually operable lever pivoted to said lifting arm eccentric with respect to said last mentioned pivot, and means for limiting the pivotal movement of said manual lever with respect to said lifting arm.

2. In a mowing machine, a main frame, a coupling frame pivotally connected therewith, a lifting arm pivoted to said main frame and connected with said coupling frame, a manually operable lever pivoted to said lifting arm at a point one side of the pivot of said lifting arm, and stops carried by said lifting arm adapted to be engaged by said manual lever for limiting its movement with respect to said lifting arm.

3. In a mowing machine, a main frame, a coupling frame pivotally connected therewith, a lifting arm pivoted to said main frame and connected with said coupling frame, a manually operable lever pivoted to said lifting arm, means for limiting the pivotal movement of said manual lever with respect to said lifting arm, and means for normally urging said lever forwardly with respect to said lifting arm.

4. In a mowing machine, a main frame, a coupling frame pivotally connected therewith, a lifting arm pivoted to said main frame and connected with said coupling frame, a manually operable lever pivoted to said lifting arm, stops located on the opposite side of said lifting arm for limiting the pivotal movement of said lever with respect thereto, and yielding means connecting said lifting arm with said lever for normally moving said lever forwardly with respect to said arm.

5. In a mowing machine, a main frame, a coupling frame pivotally connected therewith, a lifting arm pivoted to said main frame and connected with said coupling frame, a manually operable lever pivoted to said lifting arm, detent mechanism including a pawl pivoted to said lever, a sector secured to said main frame adapted to be engaged by said pawl for locking said lever in various positions of adjustment, and means connecting said pawl with said lifting arm for normally urging said lever forwardly with respect to its pivot and for depressing said pawl into engagement with said sector.

6. In a mowing machine, a main frame, a coupling frame pivotally connected therewith, a lifting arm pivoted to said main frame and connected with said coupling frame, a manually operable lever pivoted to said lifting arm, stops carried by said lifting arm for limiting the pivotal movement of said lever with respect to said arm, detent mechanism carried by said lever including a pawl pivoted to said lever, a sector secured to said main frame and adapted to be engaged by said pawl, and a spring connected to said pawl at one end and to the free end of said arm at the other end for normally urging said lever forwardly about its pivot and for depressing said pawl into engagement with said sector.

7. In a mowing machine, a main frame, a coupling frame pivotally connected therewith, a lifting arm pivoted to said main frame and connected with said coupling frame, a driving gear mechanism mounted in said main frame including a clutch mechanism, a manual lever pivoted to said lifting arm having a portion thereof projecting below the pivot thereof, a lost motion connection connecting the lower end of said lever with said clutch mechanism for disengaging said clutch mechanism when the lever is depressed to a certain predetermined position for elevating said coupling frame, and means formed on one end of said connection for locking said clutch mechanism in disengaged position and permitting a further lost motion with respect thereto.

8. In a mowing machine, a main frame, a coupling frame pivotally connected therewith, a lifting arm pivoted to said main frame and connected with said coupling frame, driving gear mechanism mounted in said main frame for operatively driving said mower including a relatively movable clutch member, a manually operable lever pivoted to said lifting arm, a lost motion connection pivotally connected directly to said lever and operatively related to said clutch member for controlling the engagement and disengagement of said clutch mechanism when the coupling frame assumes a predetermined elevation with respect to said main frame, and means for permitting lost motion movement of said connection after said clutch mechanism is locked in its disengaged position.

9. In a mowing machine, a main frame, a coupling frame pivotally connected therewith, a lifting arm pivoted to said main frame and connected with said coupling frame, driving gear mechanism mounted in said main frame for operatively driving said mower including movable clutch means, a manually operable lever pivoted to said lifting arm, a lost motion connection having one end thereof pivoted directly to said lever and operatively connected to said clutch means for controlling the engagement and disengagement of the clutch when the coupling frame assumes a predetermined elevation with respect to the main frame, and means carried by said lost motion connection for positively locking said clutch mechanism in disengaged position when the coupling frame is elevated to its inoperative position.

10. In a mowing machine, a main frame, a coupling frame pivotally connected therewith, a lifting member pivoted to said main frame and connected with said coupling frame, driving gear mechanism mounted in said main frame for operatively driving said mower including a clutch operating mechanism, a clutch fork for operating said clutch mechanism, a clutch crank shaft pivoted to said main frame and operatively connected to said clutch fork at one end thereof, a roller journalled on the other end of said clutch crank shaft, a manually operable lever pivoted to said lifting arm, a lost motion connection having one end thereof directly pivoted to said lever and the other end adapted to ride on said roller, and means carried by said lost motion connection for engaging said roller to disengage or engage said clutch by the actuation of said lever.

HARRY S. DICKINSON.